(12) United States Patent
Choi

(10) Patent No.: US 6,977,486 B2
(45) Date of Patent: Dec. 20, 2005

(54) APPARATUS FOR CHARGING BATTERY OF MOBILE COMMUNICATION TERMINAL

(75) Inventor: Jae-Won Choi, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 60 days.

(21) Appl. No.: 10/354,631

(22) Filed: Jan. 30, 2003

(65) Prior Publication Data

US 2004/0066174 A1 Apr. 8, 2004

(30) Foreign Application Priority Data

Oct. 5, 2002 (KR) .................. 10-2002-0060821

(51) Int. Cl.[7] .............................................. H02J 7/04
(52) U.S. Cl. ..................................... 320/149; 320/137
(58) Field of Search ................................ 320/149, 137, 320/150, 160, 114, 132, 107, 134, 1, 2, 3, 320/5, 10, 26, 49; 361/686, 683, 684

(56) References Cited

U.S. PATENT DOCUMENTS 5,333,177 A * 7/1994 Braitberg et al. ........... 455/559
5,854,737 A * 12/1998 Obata et al. ................ 361/686

* cited by examiner

Primary Examiner—Donald Sparks
Assistant Examiner—Lawrence Luk
(74) Attorney, Agent, or Firm—Dilworth & Barrese, LLP

(57) ABSTRACT

Disclosed is a charging apparatus capable of easily charging a battery of a mobile communication terminal and being portable. The charging apparatus includes a first connector having a power supply terminal similar to a power supply terminal of a data communication connector, the first connector being connected to a data communication connector of a supplying side mobile communication terminal supplying charge power; and a second connector having a power supply terminal similar to the power supply terminal of the data communication connector, the second connector being connected to a data communication connector of a receiving side mobile communication terminal receiving the charge power; a charging controller for charging a battery of the receiving side mobile communication terminal by supplying the charge power inputted from the power supply terminal of the first connector to the battery of the receiving side mobile communication terminal through the power supply terminal of the second connector until a battery voltage level of the receiving side mobile communication terminal reaches a charge voltage level set by a user; and a switch switched by the user's operation for connecting and disconnecting a path of supplying the charge power between the power supply terminal of the first connector and the charging controller.

7 Claims, 4 Drawing Sheets

APPARATUS FOR CHARGING BATTERY OF MOBILE COMMUNICATION TERMINAL

PRIORITY

This application claims priority to an application entitled "APPARATUS FOR CHARGING BATTERY OF MOBILE COMMUNICATION TERMINAL", filed in the Korean Industrial Property Office on Oct. 5, 2002 and assigned Serial No. 2002-60821, the contents of which are hereby incorporated by reference.

BACKGROUND OF THE INVENTION

1. Field of the Invention

The present invention relates to a mobile communication terminal, and more particularly to an apparatus for charging a battery of a mobile communication terminal.

2. Description of the Related Art

Conventionally, a repeatedly chargeable secondary battery is used as a battery for a mobile communication terminal (hereinafter referred to as the terminal) and is removable form the terminal. The battery can be charged either when mounted on the terminal or when separated from the terminal. The terminal's battery can be charged by a general purpose power supply or a vehicle power supply through a conventional charger. Since places where the conventional charger can be coupled to the general purpose power supply or to the vehicle power supply to charge the terminal's battery are limited, a special charger is needed. Further, it is inconvenient to carry the conventional charger because its size is typically larger than that of the terminal.

Where the user is in places where the user cannot use the conventional charger or where the user does not carry the conventional charger, the terminal's battery cannot be charged. At this time, if the user does not carry a spare battery, the user cannot use the terminal after the terminal's battery has been completely discharged.

In view of this situation, a generator for generating electric power using kinetic energy generated by the user's motion or solar energy, and a charger using a primary cell, have been proposed. However, because they cannot be adapted to the terminal or have low effectiveness, they cannot be currently used.

There is technology capable of charging the terminal's battery using a USB (Universal Serial Bus) associated with a computer peripheral device connection standard. As an example, there is technology capable of charging the terminal's battery by supplying electric power outputted from a device having a USB port, such as a notebook computer, a printer, etc., to the terminal's battery through a data communication connector. As another example, there is technology capable of charging the terminal's battery through a USB cable by installing the USB port in the terminal and connecting the USB cable between the USB port of the device and the USB port of the terminal. However, there is a problem in that it is more difficult for the user to carry the device having the USB port such as the notebook computer, etc. because the device having the USB port is heavier than the conventional charger. Moreover, where the terminal's battery is charged through the USB port installed in the terminal, there is another problem in that the USB port as well as the data communication connector should be additionally installed in the terminal.

SUMMARY OF THE INVENTION

Therefore, the present invention has been made in view of the above problems, and it is an object of the present invention to provide a charging apparatus capable of easily charging a terminal's battery and being portable.

It is another object of the present invention to provide a charging apparatus capable of charging a terminal's battery using electric power from a battery of another terminal to a charging voltage level set by the user, which can be set via a charge level selection switch.

In accordance with an aspect of the present invention, the above and other objects can be accomplished by the provision of an apparatus for charging a battery of a mobile communication terminal having a data communication connector, comprising: a first connector having a power supply terminal similar to a power supply terminal of the data communication connector, the first connector being connected to a data communication connector of a supplying side mobile communication terminal supplying charge power; and a second connector having a power supply terminal similar to the power supply terminal of the data communication connector, the second connector being connected to a data communication connector of a receiving side mobile communication terminal receiving the charge power; a charging controller for charging a battery of the receiving side mobile communication terminal by supplying the charge power inputted from the power supply terminal of the first connector to the battery of the receiving side mobile communication terminal through the power supply terminal of the second connector until a charge voltage level set by a user becomes a battery voltage level of the receiving side mobile communication terminal; and a switch switched by the user's operation for connecting and disconnecting a path of supplying the charge power between the power supply terminal of the first connector and the charging controller.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. The following description omits details of known functions and configurations to avoid making the subject matter of the present invention unclear.

Figure 1:
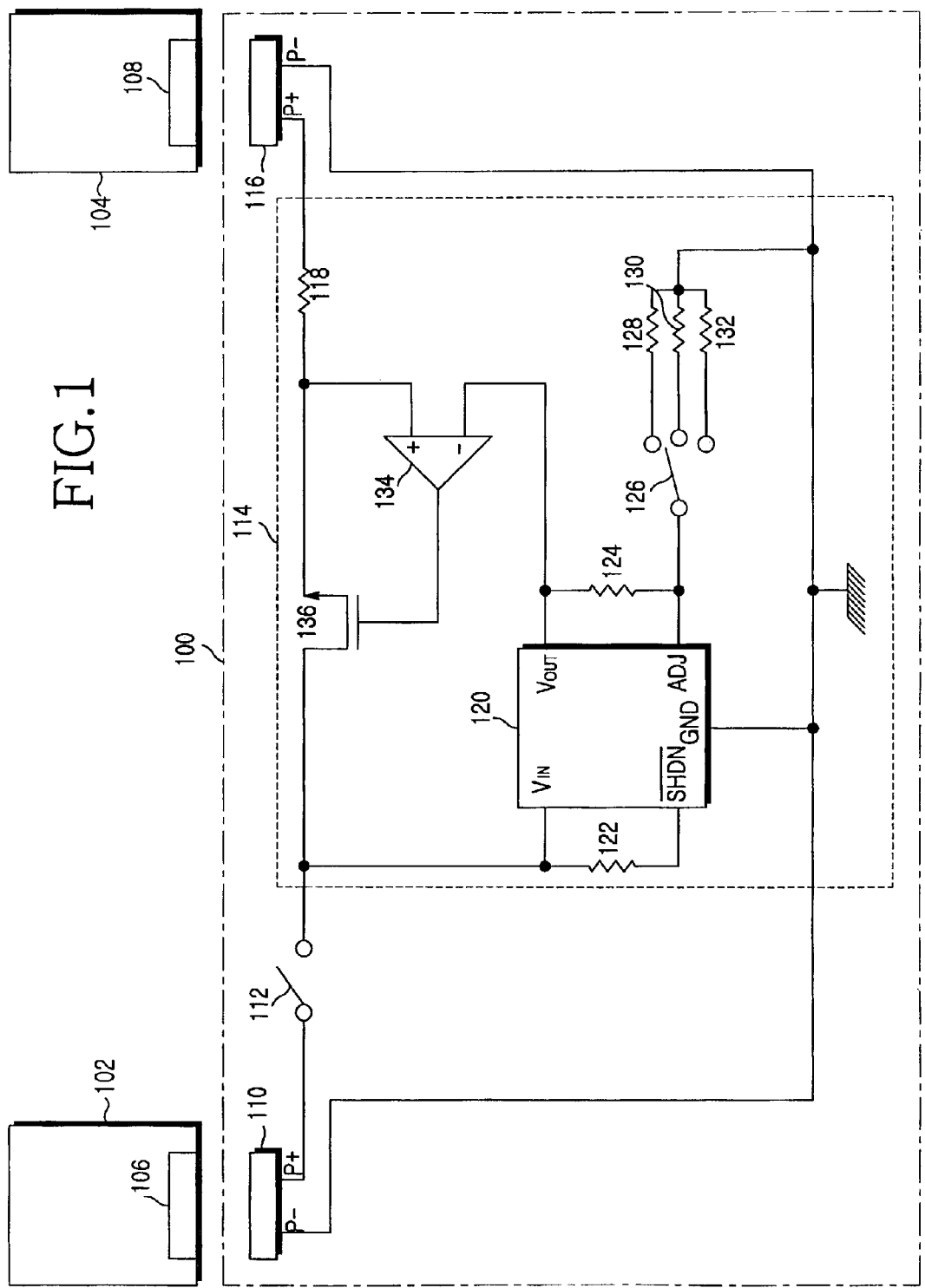
FIG. 1 is a circuit diagram illustrating a charging apparatus connected between a supplying side mobile communication terminal and a receiving side mobile communication terminal in accordance with a first embodiment of the present invention.

FIG. 1 is a circuit diagram illustrating a charging apparatus 100 connected between a supplying side terminal 102 and a receiving side terminal 104 in accordance with a first embodiment of the present invention. In FIG. 1, the receiving side terminal 104 represents a terminal with a battery that is to be charged. The supplying side terminal 102 represents another terminal capable of supplying electric power from its own battery to the battery of the receiving side terminal 104 through the charging apparatus 100 when the battery of the supplying side terminal 102 has sufficient electric power. That is, FIG. 1 is a view explaining an operation of charging a battery (not shown) of the receiving side terminal 104 by supplying electric power of a battery (not shown) of the supplying side terminal 102 to the battery of the receiving side terminal 104 through the charging apparatus 100.

The charging apparatus 100 includes a first connector 110 for connecting to a data communication connector 106 contained in the supplying side terminal 102 and a second connector 116 for connecting to a data communication connector 108 contained in the receiving side terminal 104. The first and second connectors 110 and 116 include power supply terminals P+ and ground terminals P− for connecting to power supply terminals included in the terminals 102 and 104. The first and second connectors 110 and 116 are configured to electrically connect to the data communication connectors 106 and 108 of the terminals 102 and 104 through the terminals P+ and P−.

The structure and size of charging apparatus 100 is essentially the same as that of a conventional data communication cable that connects data communication connectors conventional terminals.

The ground terminal P− of the first connector 110 is connected to the ground terminal P− of the second connector 116. The power supply terminal P+ of the first connector 110 is connected to an input terminal of a charging controller 114 through a switch 112 and the power supply terminal P+ of the second connector 116 is connected to an output terminal of the charging controller 114.

The charging controller 114 controls a charge voltage level so that electric power is supplied from the battery of the supplying side terminal 102 to the battery of the receiving side terminal 104 through the power supply terminal P+ and the ground terminal P− of the second connector 116, until the battery voltage level of the receiving side terminal reaches a predetermined charge voltage level set by a user. At this time, the switch 112 is switched by the user's operation and a path of supplying electric power between the power supply terminal of the first connector 110 and the charging controller 114 is connected and disconnected in response to a turn-on or turn-off state of the switch 112.

In the charging controller 114, the switch 112 and a current limit resistor 118 are connected to a source and a drain of a FET (Field Effect Transistor) 136, respectively. A gate of the FET 136 is connected to an output of a comparator 134. The current limit resistor 118 is connected between the drain of the FET 136 and the power supply terminal P+ of the second connector 116. The current limit resistor 118 protects the batteries of the supplying side terminal 102 and the receiving side terminal 104 from electrical surges, which may occur during the charging. A non-inversion input terminal (+) of the comparator 134 is connected to the drain of the FET 136 and the current limit resistor 118, while an inversion input terminal (−) of the comparator 134 is connected to a voltage output terminal $V_{OUT}$ of a voltage regulator 120.

The voltage regulator 120 is enabled while voltage of a logic high signal is applied to a shutdown control input terminal $\overline{SHDN}$ outputting a variable voltage output. In the voltage regulator 120, voltage that is inputted in an input terminal $V_{IN}$ varies with a level of voltage applied to an output voltage adjustment terminal ADJ and is outputted to a voltage output terminal $V_{OUT}$. For example, "TC1174" made by Microchip Technology Inc. can be employed as the voltage regulator 120. In the voltage regulator 120, a first resistor 122 is connected between the input terminal VIN and the shutdown control input terminal $\overline{SHDN}$. A second resistor 124 is connected between the voltage output terminal $V_{OUT}$ and the output voltage adjustment terminal ADJ. Three resistors 128, 130 and 132 having different resistance values are connected together at one end, to provide connections of different resistance between the output voltage adjustment control ADJ and ground through a charge level selection switch 126.

The charge level selection switch 126 is switched by the user's operation and one of the resistors 128, 130 and 132 is selected according to the switching of the charge level selection switch 126. The selected resistor 128, 130 or 132 is connected to the resistor 124. At this time, voltage outputted to the voltage output terminal $V_{OUT}$ of the voltage regulator 120 is divided by one of the resistors 128, 130 and 132 and the resistor 124 and applied to the output voltage adjustment terminal ADJ of the voltage regulator 120. Accordingly, the voltage outputted at the voltage output terminal $V_{OUT}$ of the voltage regulator 120 is varied by the switching of the charge level selection switch 126.

Since the voltage output terminal $V_{OUT}$ of the voltage regulator 120 is connected to the inversion input terminal (−) of the comparator 134, the FET 136 is turned on while the level of the battery voltage of the receiving side terminal 104 is lower than that a level of output voltage of the voltage output terminal $V_{OUT}$ of the voltage regulator 120. On the other hand, the FET 136 is turned off when the level of the battery voltage of the receiving side terminal 104 is higher than that a level of output voltage of the voltage output terminal $V_{OUT}$ of the voltage regulator 120. Accordingly, the battery of the receiving side terminal 104 is charged until its battery voltage level reaches the charge voltage level based on the resistor 128, 130 or 132 selectively set by the user among three charge voltage levels based on the resistors 128, 130 and 132. Here, the number of the resistors is three, but the number of the resistors can be more or less than three. An increased number of resistors allows the user to select a correspondingly increased number of charge voltage levels through the charge level selection switch 126.

When the user desires to charge the battery of the receiving side terminal 104 from that of the supplying side terminal 102 using the charging apparatus 100, the first and second connectors 110 and 116 of the charging apparatus 100 are connected to the data communication connector 106 of the supplying side terminal 102 and the data communication connector 108 of the receiving side terminal 104, respectively. At this time, the user can set the charge voltage level of the receiving side terminal 104 by manipulating the charge level selection switch 126. If the user then turns the switch 112 on, the battery of the receiving side terminal 104 is charged by the battery power of the supplying side terminal 102. Thereafter, if the battery voltage level of the receiving side terminal 102 reaches the charge voltage level set through the charge level selection switch 126 by the user, the FET 136 is turned off and the charging is stopped.

Because the charging apparatus 100 can be simply implemented using only small-sized circuit devices, the entire charging apparatus 100 can be made in the form of a cable having first and second connectors 110 and 116. Therefore, the user can carry the charging apparatus 100 more conveniently than a conventional terminal charger. The switch 112 and the charging controller 114 can be made in one body together with one of the first or second connectors 110 and 116. Alternatively, the switch 112 and the charging controller 114 can be made so that they are arranged in a middle of a cable connected between the first and second connectors 110 and 116.

When the user carries the easily portable charging apparatus 100 instead of the conventional charger, the user can charge the battery of the user's terminal using the battery of another terminal in places where the conventional charger cannot be used or where the user would not carry the conventional charger.

Figure 2:
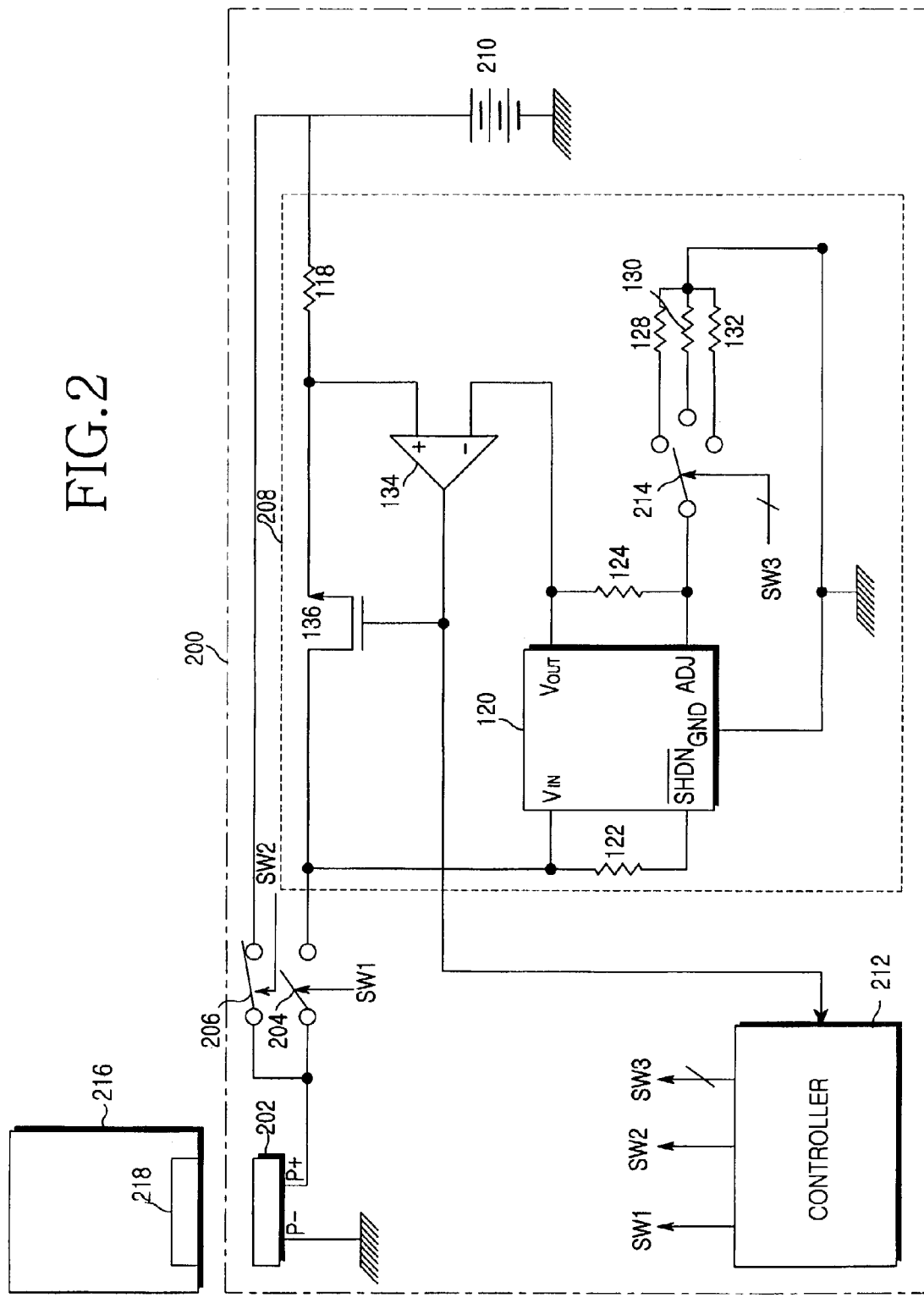
FIG. 2 is a circuit diagram illustrating a charging apparatus embedded in a mobile communication terminal in accordance with a second embodiment of the present invention.

FIG. 2 is a circuit diagram illustrating a charging apparatus embedded in a mobile communication terminal in accordance with a second embodiment of the present invention. That is, FIG. 2 illustrates a case where a charging apparatus is embedded in a terminal 200 so that the user can charge the battery of the terminal 200 using the battery of another terminal without carrying the charging apparatus 100 shown in FIG. 1. Some components included in the terminal 200 not directly associated with the present invention are omitted in FIG. 2.

Figure 4:
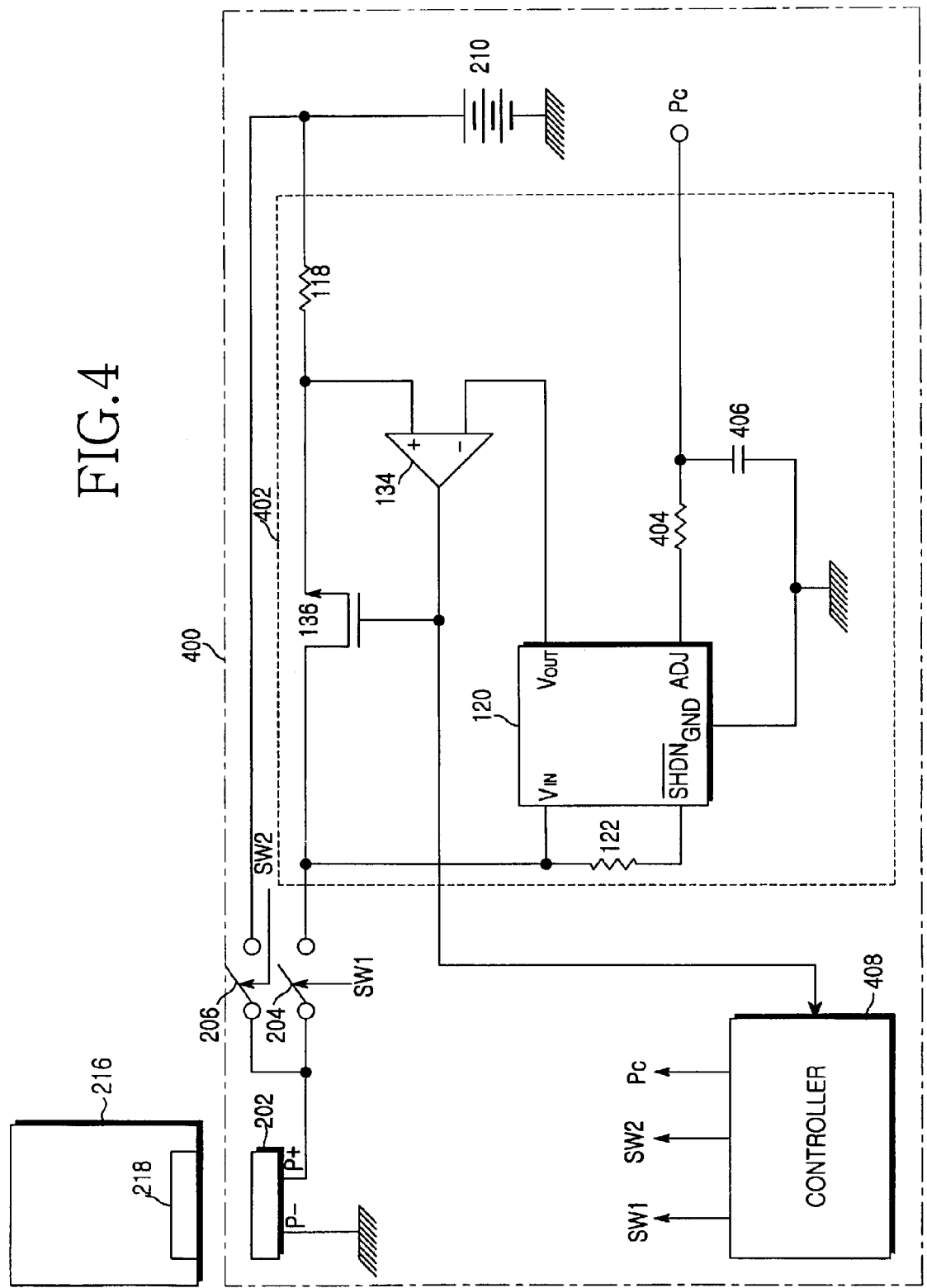
FIG. 4 is a circuit diagram illustrating a charging apparatus embedded in a mobile communication terminal in accordance with a third embodiment of the present invention.

In the drawings the same or similar elements are denoted by the same reference numerals even though they are depicted in different drawings of FIGS. 1, 2 or 4.

In FIG. 2, the other terminal 216 is typically the supplying side terminal. Alternatively, terminal 216 can be a receiving side terminal when equipped with charging apparatus such as in terminal 200.

The terminals 200 and 216 include data communication connectors 202 and 218, respectively. A ground terminal P− of the data communication connector 202 included in the terminal 200 is grounded. Further, a power supply terminal P+ of the data communication connector 202 of the terminal 200 is connected to a charging controller 208 through a first switch 204 (SW1) and to a plus (+) terminal of a battery 210 of the terminal 200 through a second switch 206. The data communication connector 202 is connected to the data communication connector 218 of the terminal 216, typically through a conventional data communication cable (not shown).

The first switch 204 is diversely turned on/off (i.e. opened) so that its on/off state is opposite to the on/off state of the second switch 206. In an initial state, the first switch 204 is turned off, but the second switch 206 is turned on (i.e. closed). When the battery 210 of the terminal 200 is being charged from a battery of the terminal 216, the first switch 204 is turned on and the second switch 206 is turned off. When the battery of the terminal 216 is being charged from the battery 210 of the terminal 200 or when the terminal 200 carries out a conventional operation independently of the charging in accordance with the present invention, the first and second switches 204 and 206 are kept in the initial (or default) state.

The first and second switches 204 and 206 are switched by control of a controller 212 which typically is also employed as a main controller of the terminal 200. Further, a charge level selection switch 214 included in the charging controller 208 is similar to the charge level selection switch 126 shown in FIG. 1, except that the switching of the charge level selection switch 214 is preferably controlled by the controller 212. That is, the first and second switches 204 and 206 are switched in response to first and second switching control signals SW1 and SW2 outputted from the controller 212. The charge level selection switch 214 is switched in response to a third switching control signal SW3 outputted from the controller 212. Here, each of the first and second switches 204 and 206 is turned on or off, but the charge level selection switch 214 is switched in three stages.

Where the charging apparatus is embedded in the terminal 200, an additional switching button may be needed in the terminal 200. To remove this need, the terminal 200 is configured so that the controller 212 can control the switching of the first and second switches 204 and 206 as well as the charge level selection switch 214. With this configuration, the user can use the charging function of the present invention by selecting an option for the charging function in a menu displayed on a display module (not shown) of the terminal 200. For example, the charging function can be added to a conventional menu as an "inter-terminal charging mode" so that the user can use it. Alternatively, instead of the first and second switches 204 and 206 and the charge level selection switch 214 being controlled by the controller 212, other switches capable of being operated by the user can be exposed and installed on an outside of the terminal 200. In this case, other switches corresponding to the first and second switches 204 and 206 are preferably diversely turned on or off opposite to each other and controlled by a single user operation.

Figure 3:
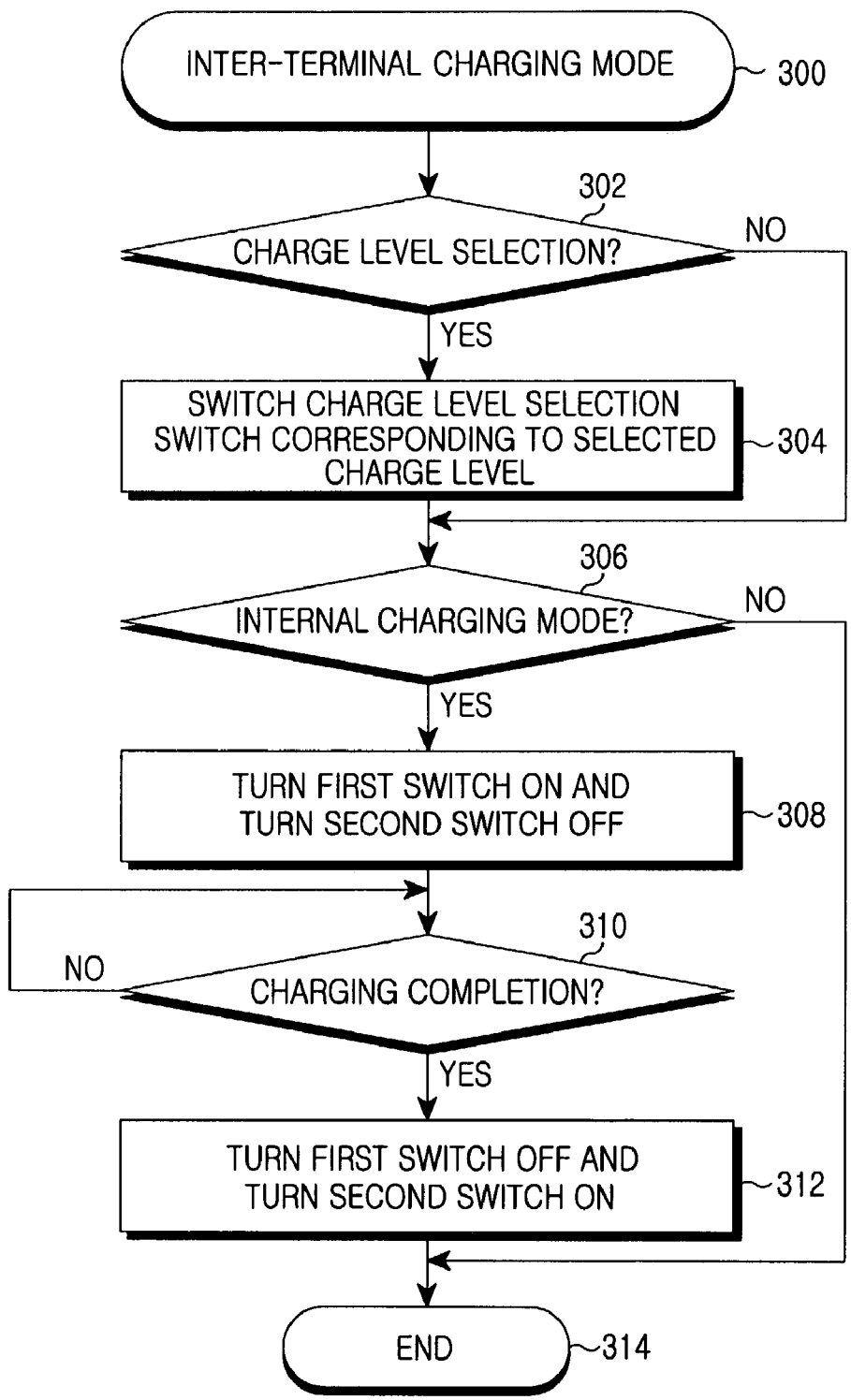
FIG. 3 is a flow chart illustrating an operation of a controller included in FIG. 2 in accordance with an embodiment of the present invention.

Now, a detailed description will be given of a flow chart of FIG. 3 having steps 300 to 314 illustrating an operation of the controller 212 according to an embodiment of the present invention. When the terminal 216 and the terminal 200 are the supplying side terminal and the receiving side terminal, respectively, the electric power of the battery (not shown) of the supplying side terminal 216 can charge the battery 210 of the receiving side terminal 200. Otherwise, when the terminal 200 and the terminal 216 are the supplying side terminal and the receiving side terminal, respectively, the electric power of the battery 210 of the supplying side terminal 200 can charge the battery of the receiving side terminal 216. In this case, the user connects the data communication connector 218 of the terminal 216 and the data communication connector 202 of the terminal 200 using the data communication cable. At this time, the user selects the inter-terminal charging mode in accordance with the present invention in the menu displayed on the display module (not shown) of the terminal 200 at step 300. The controller 212 waits for the charge voltage level selection by the user at step 302. If the user selects any one of selectable charge voltage levels in the menu for the charging mode through the charge level selection switch 214, the controller 212 controls the switching of the charge level selection switch 214 in response to the selected charge voltage level at step 304 and then proceeds to step 306. If no charge voltage level is selected in step 302, the controller 212 leaves the charge level selection switch 214 in the default state and then proceeds to step 306. The controller 212 waits for the selection of an internal charging mode by the user at the above step 306.

The internal charging mode means that the battery 210 of the terminal 200, as the receiving side terminal, is to be charged the electric power of the battery of the supplying side terminal 216. When the internal charging mode is not selected means that the electric power of the battery 210 of the terminal 200, as the supplying side terminal, is to charge the battery of the receiving side terminal 216. Where the internal charging mode is selected, the first switch 204 should be turned on and the second switch 206 should be turned off because the battery 210 is being charged by electric power inputted from the battery of the supplying side terminal 216 through the data communication connector 202 via a first path.

Otherwise, where the internal charging mode is not selected, the first switch 204 should be turned off and the second switch 206 should be turned on because the electric power of the battery 210 of the terminal 200, as the supplying side terminal, is to charge the receiving side terminal 216 through the data communication connector 202 via a second path. Conventional data communication is being accomplished irrespectively of the charging function.

If the internal charging mode is selected at step 306, the controller 212 controls the first and second switches 204 and 206 so that the first switch 204 can be turned on and the second switch 206 can be turned off (step 308). Otherwise, if the internal charging mode is not selected, the controller 212 leaves the first and second switches 204 and 206 in the default state where the first switch 204 and the second switch 206 are maintained in the turn-off state and the turn-on state, respectively.

The controller 212 ends the inter-terminal charging mode at step 314.

Thus, if the internal charging mode is selected, the electric power inputted from the supplying side terminal 216 through the data communication connector 202 is inputted into the charging controller 208 through the first switch 204 and then the battery 210 is charged up to the charge voltage level selected by the user through an operation of the charging controller 208 similar to the operation of the charging controller 114 described in regard to FIG. 1. Further, the controller 212 determines at step 310 whether the charging has been completed. This is determined by an output of the comparator 134. The output of the comparator 134 is applied to the gate of the FET 136, shown in FIGS. 1 and 2, and is also applied to the controller 212 shown in FIG. 2. Thus, when the output of the comparator 134 is a logic high signal after the first and second switches 204 and 206 are switched, the controller 212 recognizes the fact that the charging has been completed up to the charge voltage level set by the user. If so, the controller 212 controls the first and second switches 204 and 206 so that the first switch 204 can be turned off and the second switch 206 can be turned on at step 312. That is, the first and second switches 204 and 206 return to the default state. The inter-terminal charging mode ends.

Accordingly, the user need only carry a conventional data communication connector to charge the battery of the user's terminal from another terminal in places where the conventional charger cannot be used or where the user would not carry the conventional charger.

On the other hand, in a case where the internal charging mode is not selected, the user can supply the electric power from the battery of the terminal 200, acting as the supplying side terminal, to charge the battery of the receiving side terminal 216 where the receiving side terminal 216 has a built-in charging apparatus such as the terminal 200 shown in FIG. 2 or can be connected to the terminal 200 by the charging apparatus 100 shown in FIG. 1. Where the receiving side terminal 216 has a built-in charging apparatus such as the terminal 200, the receiving side terminal 216 performs the charging control operation as in FIG. 3. Where the receiving side terminal 216 is connected to the terminal 200 by the charging apparatus 100 shown in FIG. 1, the charging apparatus 100 performs the charging control operation as in FIG. 1.

FIG. 4 is a circuit diagram illustrating a charging apparatus embedded in a mobile communication terminal in accordance with a third embodiment of the present invention. FIG. 4 illustrates a terminal 400 equipped with a charging controller 402 in which a predetermined charge voltage level can be set by a pulse signal output Pc from a controller 408, without using the charge level selection switch 214 or the resistors 128, 130 and 132 within the charging controller 208 shown in FIG. 2. The controller 408 outputs the pulse signal Pc to set the battery charge level based on a PWM (Pulse Width Modulation) pulse or a PDM (Pulse Density Modulation) pulse. An integrating circuit made up of a resistor 404 and a capacitor 406 is arranged between the output voltage adjustment terminal ADJ of the voltage regulator 120 and an output terminal of the pulse signal Pc of the controller 408. Neither the charge level selection switch (214, 126) nor the resistors 124, 128, 130 and 132 are required. The pulse signal Pc outputted from the controller 408 is converted into DC (Direct Current) voltage by the integrating circuit made up of the resistor 404 and the capacitor 406 and then applied to the output voltage adjustment terminal ADJ of the voltage regulator 120. At this time, since the DC voltage depends upon the pulse signal Pc, the controller 408 outputs the pulse signal Pc having pulse width or pulse density corresponding to the charge voltage level selected by the user in order to decide the battery voltage level.

Although the terminal 400 does not use the charge level selection switch 214 or the resistors 124, 128, 130 and 132 shown in FIGS. 1 and 2, the terminal 400 allows the user to select a desired charge voltage level among an increased number of charge voltage levels.

As apparent from the above-description, the present invention allows the user to charge the battery of the user's terminal using the battery of another terminal in places where the user cannot use the conventional charger or where the user does not carry the conventional charger, if the user either carries the portable charging apparatus 100 or carries the conventional data communication cable and has a mobile terminal with the embedded charging apparatus.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the following claims, along with their full scope of equivalents.

What is claimed is:

1. An apparatus for charging, from a battery of a supplying side mobile communication terminal, a battery of a receiving side mobile communication terminal having a data communication connector, comprising:

a first connector having a power supply terminal for connecting to a power supply terminal of the data communication connector, the first connector being configured to connect to a data communication connector of the supplying side mobile communication terminal; a second connector having a power supply terminal for connecting to the power supply terminal of the data communication connector, the second connector being configured to connect to the data communication connector of the receiving side mobile communication terminal receiving the charge power; and a charging controller for charging a battery of the receiving side mobile communication terminal by supplying charge power from the power supply terminal of the first connector to the battery of the receiving side mobile communication terminal through the power supply terminal of the second connector until a battery voltage level of the receiving side mobile communication terminal reaches a charge voltage level set by a user.

2. The apparatus as set forth in claim 1, further comprising a switch switched by the user's operation for connecting and disconnecting a path of charge power between the power supply terminal of the first connector and the charging controller.

3. The apparatus as set forth in claim 1, wherein the charging controller further includes:
   a charge level selection switch switched by the user's operation for selectively setting one of a plurality of predetermined charge voltage levels.

4. A mobile communication terminal having a data communication connector, comprising:
   a charging controller for charging a battery of the mobile communication terminal by supplying charge power from the data communication connector to the battery via a first path until a battery voltage level of the mobile communication terminal reaches a charge voltage level set by a user;
   a first switch switched by the user's operation for connecting and disconnecting the first path of charge power, wherein the first path is between the data communication connector, the charging controller and the battery; and
   a second switch switched opposite to the first switch for connecting and disconnecting a second path of charge power, wherein the second path is between the data communication connector and the battery.

5. The mobile communication terminal as set forth in claim 4, wherein the charging controller further includes:
   a charge level selection switch switched by the user's operation for selectively setting one of a plurality of predetermined charge voltage levels.

6. A mobile communication terminal having a data communication connector, comprising:
   a charging controller for charging a battery of the mobile communication terminal by supplying charge power from the data communication connector to the battery via a first path until a battery voltage level of the mobile communication terminal reaches a predetermined charge voltage level;
   a first switch for connecting and disconnecting the first path of charge power, wherein the first path is between the data communication connector, the charging controller and the battery;
   a second switch for connecting and disconnecting a second path of charge power,
wherein the second path is between the data communication connector and the battery; and
   a controller for controlling the first and second switches to allow the first switch to be turned on and the second switch to be turned off until the battery voltage level of the mobile communication terminal reaches the predetermined charge voltage level set by a user.

7. The mobile communication terminal as set forth in claim 6, wherein the controller controls the first and second switches only when the user selects an internal charging mode for charging the battery of the mobile communication terminal.

* * * * *